United States Patent [19]

Lynn et al.

[11] 4,425,228

[45] Jan. 10, 1984

[54] WET-CLASSIFYING METHOD FOR RECOVERY OF CARBON AND IRON-BEARING PARTICLES

[75] Inventors: John D. Lynn, Center Valley; R. Donald Bartusiak, Allentown, both of Pa.

[73] Assignee: Bethlehem Steel Corporation, Bethlehem, Pa.

[21] Appl. No.: 354,312

[22] Filed: Mar. 2, 1982

[51] Int. Cl.³ .......................... B03B 7/00; C22B 7/02
[52] U.S. Cl. .......................................... 209/17; 209/2; 209/10; 210/710; 210/713; 210/787; 210/912; 75/25; 75/108; 75/120
[58] Field of Search ...................... 209/2, 10, 17, 211; 55/72; 75/25, 108, 120; 210/710, 713, 724, 787, 912

[56] References Cited

U.S. PATENT DOCUMENTS

| 3,384,310 | 5/1968 | van Slyke et al. | 209/17 |
| 3,471,204 | 10/1969 | Koch et al. | 209/10 |
| 3,617,559 | 11/1971 | Cywin | 210/713 |
| 4,010,186 | 3/1977 | Broun, Jr. | 210/912 |
| 4,018,680 | 4/1977 | Kupfer | 75/25 |
| 4,069,315 | 1/1978 | Wagner et al. | 75/25 |
| 4,119,455 | 10/1978 | Cass et al. | 75/25 |
| 4,134,755 | 1/1979 | Maeda | 75/25 |
| 4,313,822 | 2/1982 | Cases | 209/233 |

FOREIGN PATENT DOCUMENTS

| 2603096 | 7/1976 | Fed. Rep. of Germany | 209/211 |
| 2758118 | 6/1979 | Fed. Rep. of Germany | 75/25 |
| 52-36501 | 3/1977 | Japan | 75/25 |
| 2017670 | 10/1979 | United Kingdom | 75/25 |

OTHER PUBLICATIONS

Trawinski, Dr. Helmut, Theory, Applications, and Practical Operation of Hydrocyclones, EIMJ.–Sep. 1976, pp. 115, 116 and 119–127.

"Dezincing Equipment and Operation Based on Wet Classification of Wet-Cleaned BF Dust" by Shigetoshi Uno, et al.—Nippon Steel Technical Report No. 13, Jun. 1979.

Primary Examiner—David L. Lacey
Attorney, Agent, or Firm—John I. Iverson; William B. Noll; John J. Selko

[57] ABSTRACT

A method for separating carbon and iron bearing particles from zinc and lead bearing particles contained in an aqueous slurry of blast furnace dust and the recovery and reuse of the carbon and iron bearing particles as charge material in a blast furnace is described.

An aqueous slurry of blast furnace flue dust is collected in a thickener. The thickened aqueous slurry is strained to remove large foreign matter and make a size separation at about 4 mm. The plus 4 mm particles are generally wasted. The aqueous slurry containing the minus 4 mm particles is fed into at least one hydrocyclone where a size separation is made at between about 3 and 5 microns. A substantial portion of the carbon and iron bearing particles report to the hydrocyclone underflow and a substantial portion of the zinc and lead bearing particles report to the hydrocyclone overflow. The carbon and iron bearing particles are passed to a preparation plant to be prepared for reuse in the blast furnace. The zinc and lead bearing particles may be passed to waste or stored for subsequent processing.

Optionally, the water in the slurry may be treated with a neutralizing agent to precipitate dissolved zinc and lead values which can be removed from the water with the zinc and lead bearing particles in a hydrocyclone to thereby upgrade the water to acceptable environmental standards.

9 Claims, 5 Drawing Figures

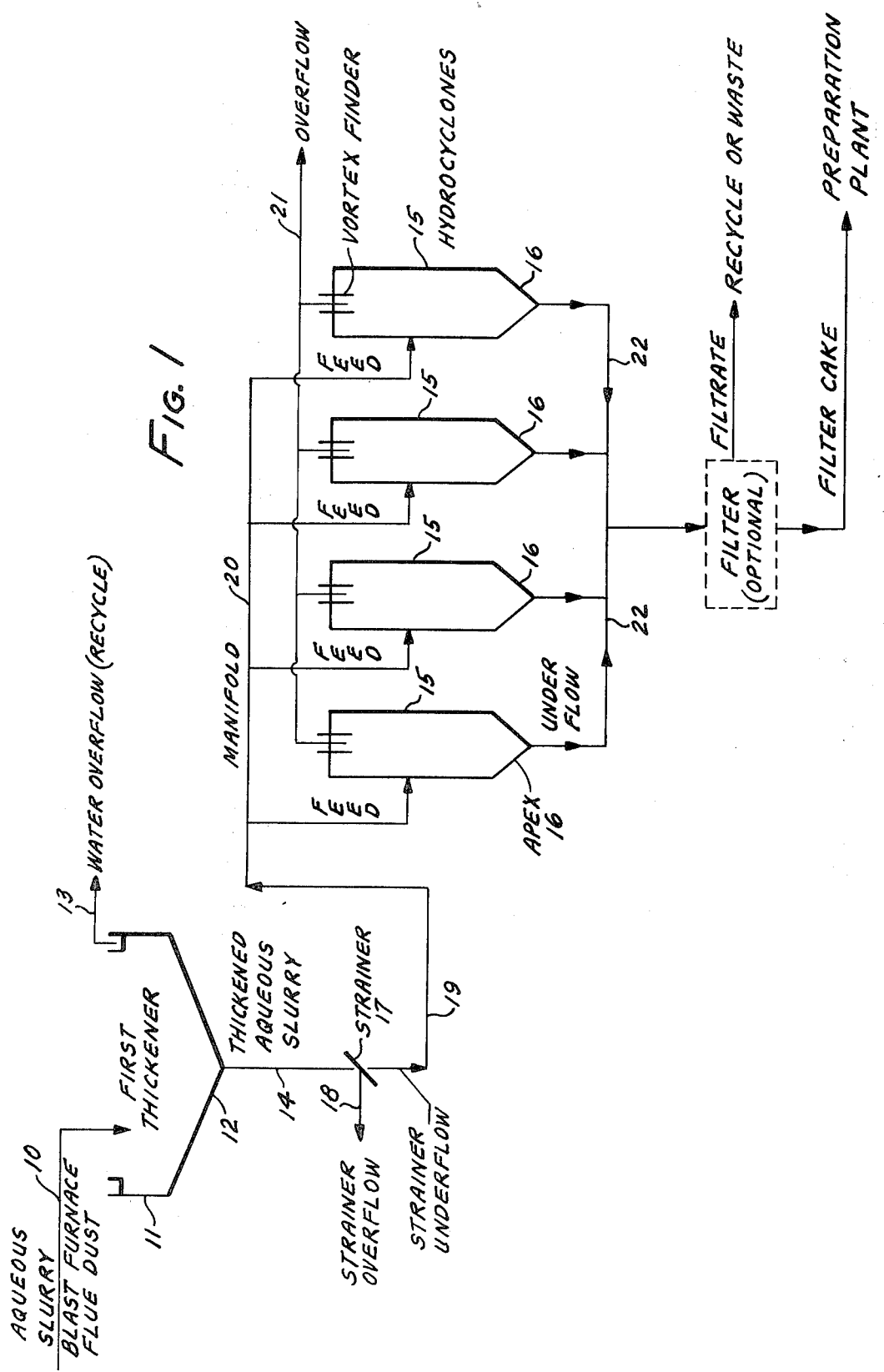

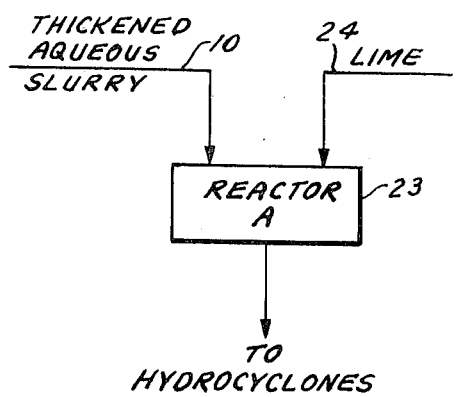
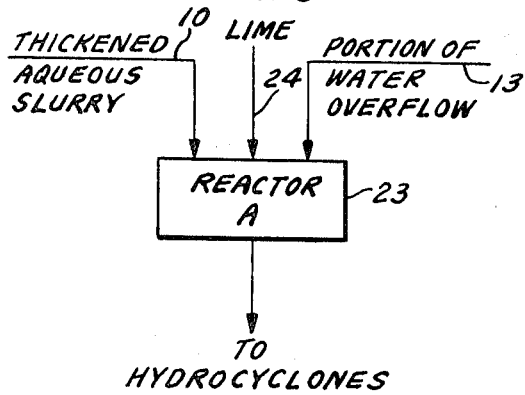
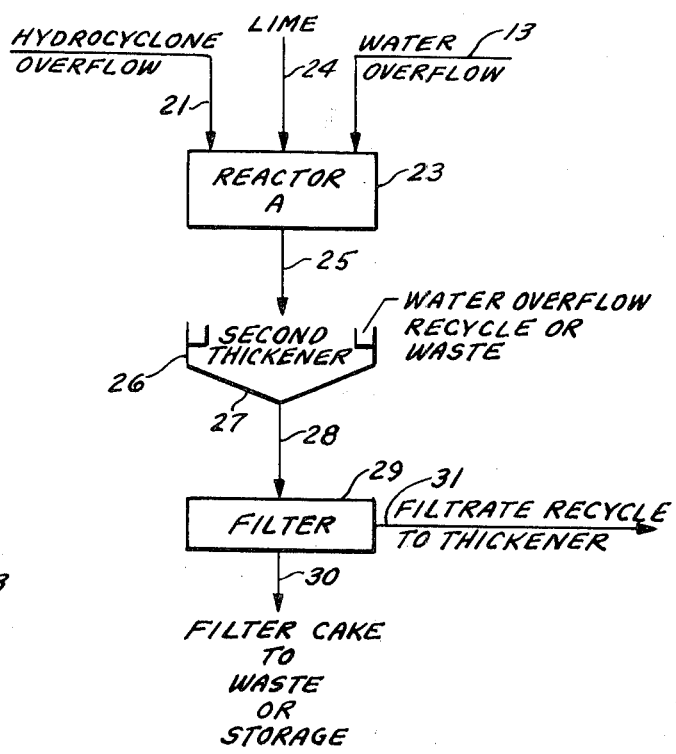
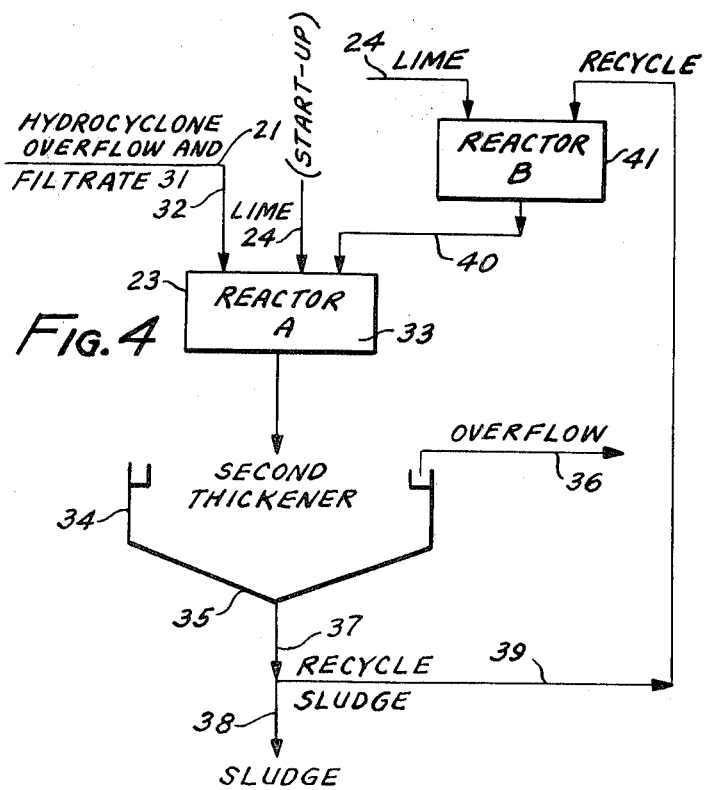

WET-CLASSIFYING METHOD FOR RECOVERY OF CARBON AND IRON-BEARING PARTICLES

BACKGROUND OF THE INVENTION

This invention is directed to a method for treating an aqueous slurry of blast furnace flue dust wherein carbon and iron bearing particles are separated from contaminating particles, i.e. zinc and lead bearing particles, and are recovered and reused in the blast furnace.

Optionally, the water in the slurry can be treated to precipitate dissolved zinc and lead values which can be separated from the water to thereby upgrade the water to acceptable environmental standards.

Basic iron is produced by smelting iron oxides in the presence of carbon, fluxes and pressurized air in vertical shaft or blast furnaces. As the air passes upwardly in the furnace, reactions occur in which iron oxides are reduced to molten metallic iron which is collected in the hearth of the furnace. Large volumes of waste gases and minute solid particles are produced in the process. The solid particles are carried out of the top of the furnace in the waste gases. The waste gases are initially dry treated to remove relatively coarse particles and are then wet electrostatically treated or wet scrubbed with fine water sprays to remove a substantial portion of the relatively fine particles so that the waste gases meet acceptable environmental standards when discharged into the atmosphere.

The relatively fine particles removed from the waste gases are referred to as blast furnace flue dust and are collected as an aqueous slurry in particle settling devices, for example thickeners. Generally, the size of the fine particles in flue dust is less than about 100 mesh. A large weight percentage of the particles are carbon and iron bearing particles which, if recovered, could be recycled to the blast furnace.

The flue dust also contains contaminants, particularly zinc and lead bearing particles. Minute quantities of zinc and lead can be tolerated in the blast furnace. However, large quantities of such elements cannot be tolerated because both zinc and lead are known to attack the refractory lining the interior surface of the metallic shell of the blast furnace. Zinc and lead cause the refractory to spall thereby decreasing the thickness of the refractory and reducing the life of the lining and shortening its life. Zinc and lead can also cause scaffolding which impedes flow of materials in the furnace. It is, therefore, essential to separate the zinc and lead bearing particles from the carbon particles and iron bearing particles prior to reuse of the flue dust as sinter or pellets which constitute part of the burden charged into the blast furnace.

Several prior art processes have been suggested for separating zinc and lead bearing particles from blast furnace flue dust. In some processes, addition agents which combine with zinc and lead are added to the flue dust and the zinc and lead removed as complex compounds. Other processes suggest heating the flue dust to vaporize zinc and lead which are then condensed on cold surfaces. Still other processes involve balling the flue dust and vaporizing the zinc and lead during the pelletizing or heat-hardening step. None of the above processes have proven to be commercially feasible. Still other processes in which the flue dust is comminuted and the comminuted particles are subjected to wet classifying means to separate zinc and lead bearing particles from the flue dust are known. Unfortunately, in such processes, a quantity of slimes is formed. The slimes adversely affect the separation of zinc and lead bearing particles. In which case, it is necessary to separate the slimes from the flue dust prior to separating other particles from the flue dust.

Blast furnace flue dust is collected as an aqueous slurry, therefore, some of the zinc and lead values may dissolve in the water particularly if the water is acidic or highly basic, thus contaminating the water. Such water usually cannot be wasted in environmental waters. Recycling of the acid water in the plant results in a build-up of dissolved zinc and lead values which can poison the system. It is essential that a substantial portion of the dissolved zinc and lead values be removed from the water to upgrade its quality prior to disposal or reuse.

There is, therefore, a need for a simple, efficient method for separating carbon and iron bearing particles from other particles such as zinc and lead bearing particles in an aqueous slurry of blast furnace flue dust whereby a substantial portion of the carbon and iron bearing particles contained therein can be recovered and reused as part of the solid burden charged into the blast furnaces.

It is an object of this invention to provide a simple, efficient method for separating a substantial portion of carbon and iron bearing particles from particles of zinc and lead bearing particles contained in blast furnace flue dust, recovering the carbon and iron bearing particles and preparing them for reuse in a blast furnace.

It is another object of this invention to provide a simple efficient treatment of an aqueous slurry of blast furnace flue dust whereby a substantial portion of the carbon and iron bearing particles are separated from particles of zinc and lead bearing particles contained therein and, optionally, dissolved zinc and lead values are precipitated and removed from the water to upgrade the water to acceptable environmental standards.

SUMMARY OF THE INVENTION

According to this invention, there is provided a method to treat an aqueous slurry of blast furnace flue dust containing carbon and iron bearing particles and zinc and lead bearing particles whereby the carbon and iron bearing particles are separated from the zinc and lead bearing particles and are recovered and prepared for reuse in the blast furnace. Optionally, the water in the slurry may be treated with a neutralizing agent to precipitate a substantial portion of zinc and lead values dissolved therein and the precipitated zinc and lead values are separated from the water to upgrade the water to acceptable environmental standards.

The method includes collecting the aqueous slurry of blast furnace dust in a particle separating device, i.e. a thickener. The particles settle to form a thickened aqueous slurry and partially clarified water overflows the top of the thickener. The thickened slurry containing between about 1 to 30 weight percent particles is intially strained to separate relatively large foreign matter and relatively large particles, for example about plus 4 mm, as strainer overflow from the slurry. The strainer underflow, i.e. the aqueous slurry which passes through the strainer, contains all small particles, for example, particles which are smaller than minus 4 mm. The strainer underflow is fed into hydrocyclones adapted to make a size separation at about 5 microns. About 80 weight percent of the particles and not more than 10 weight percent of the water in the charged slurry report to the hydrocyclone underflow. The particles are predominantly carbon and iron bearing particles. About 20 weight percent of the particles and the remainder of the water report to the hydrocyclone overflow. The particles in the overflow are predominantly zinc and lead bearing particles.

The hydrocyclone underflow is filtered. The filtrate is recycled in the system. The filter cake is passed to a preparation plant to be prepared as sinter or pellets which are recharged to the blast furnace.

The hydrocyclone overflow is dewatered and subsequently passed to waste or is stored for subsequent reclamation of the zinc values.

If the water is acidic, i.e. has a pH which is less than 7.0, zinc and lead may be dissolved in the water of the slurry. The thickened aqueous slurry may be treated with a neutralizing agent, for example lime, to adjust the pH of the water to between about pH 8.4 to 9.4 to precipitate the dissolved zinc and lead values. The precipitates can be removed from the slurry as part of the hydrocyclone overflow.

The water may also be neutralized after hydrocycloning to remove dissolved zinc and lead values to upgrade the water to acceptable environmental standards.

FIGURES OF THE INVENTION

FIG. 1 is a schematic flowsheet of the method of the invention.

FIGS. 2 to 5 are variations of the schematic flowsheet shown in FIG. 1 wherein the water in the aqueous slurry is treated to remove dissolved zinc and lead values.

PREFERRED EMBODIMENT OF THE INVENTION

The preferred embodiment of the invention is shown in FIG. 1. As shown, an aqueous slurry of blast furnace flue dust 10 containing carbon and iron bearing particles and zinc and lead bearing particles and a small percentage, about 1 to 5 weight percent, large extraneous or foreign matter is collected in a particles separating device 11 which is usually a thickener. In these specifications and claims when a thickener is recited it is by way of example only. Typically, the size consist of the particles in the flue dust is from submicron size to about 6.35 mm with foreign matter being larger than 6.35 mm. However, about 95 weight percent of the particles are smaller than 0.149 mm. The chemical composition of a typical blast furnace flue dust is shown below:

| Material | Weight Percent Solids |
|---|---|
| Iron oxides as Fe (total) | 33.0–42.7 |
| C (free) | 30.0–42.0 |
| Zn | 0.62–3.7 |
| Pb | 0.15–0.34 |
| S | 0.88–2.24 |
| $K_2O$ | 0.20–0.44 |
| $Na_2O$ | 0.07–0.14 |

The slurry remains in the thickener for a time, for example from a few hours to about 24 hours or longer, to allow a substantial portion of the particles to settle to the bottom 12 of the thickener. Partially clarified water 13 overflows the thickener. The overflow water contains a small portion of the smaller particles of the flue dust and may contain such contaminants as cyanides and acids. It may be necessary to treat the overflow water or at least a portion of the water to remove the contaminants to upgrade the purity of the water to acceptable environmental standards prior to disposal of the water in environmental waters or reuse in the system. If the overflow water contains dissolved zinc and lead values, it may be necessary to treat the water to remove such values since reuse of the water will result in build-up of the dissolved zinc and lead values which will poison the system.

The thickened aqueous slurry 14 removed from the bottom of the thickener may contain as little as 1 weight percent particles and as much as 36 or more weight percent particles. If the slurry contains less than about 3 weight percent solids, it is not practical to process the slurry because energy is wasted in transporting and classifying it in devices, for example, hydrocyclones 15. It is therefore desirable to process a slurry containing at least 3 weight percent particles and it is preferred to treat a slurry containing not less than 5 weight percent particles since such slurry more fully utilizes the energy required for transport and processing.

As noted previously, the aqueous slurry 14 may contain as much as 36 weight percent particles or more. At a particles content of 30 weight percent or more, the efficiency of separation of the particles is adversely affected. The discharge from the apex 16 of hydrocyclones becomes rope-like and unusually large quantities of the smaller contaminating particles, usually passing upwardly in the hydrocyclones, are found in the apex discharge or hydrocyclone underflow. At a particles content of about 20 weight percent, the rope-like discharge is no longer in evidence and an efficient separation of relatively large and relatively smaller particles is achieved in the hydrocyclones. The best efficiency of separation is achieved at a particles content of about 15 weight percent. Therefore, while commercially feasible and efficient separations can be achieved at a particles content range between about 3 and 20 weight percent, it is preferred to treat a slurry having a particles content range between about 5 and 15 weight percent.

Because the thickened aqueous slurry usually contains a very small weight percent, for example less than 3 weight percent particles of large foreign matter or large carbon and iron bearing particles as noted previously, it is necessary to remove such unusually large particles prior to classification to prevent clogging of the hydrocyclones. (In these specifications and claims wherever mesh or screen sizes are given such sizes are U.S.S. standards.)

The thickened aqueous slurry is initially passed to a strainer 17 having openings, for example about 4 mm. Passing the slurry through the strainer separates all the large foreign matter and particles larger than, for example, 4 mm as a strainer overflow 18 from all particles smaller than, for example, 4 mm as a strainer underflow 19. The strainer overflow may contain about 3 to 5 weight percent particles in the slurry, some of which may contain carbon and iron. The strainer overflow may be treated by conventional means to reclaim the carbon and iron bearing particles which can be passed to a preparation plant wherein the particles can be used to produce sinter or pellets which are charged into the blast furnace.

The strainer underflow, which contains between about 95 and 97 weight percent of the particles in the thickened aqueous slurry, is passed to a manifold 20 which feeds at least one hydrocyclone 15 and preferably a plurality of hydrocyclones.

It has been found that substantially all the carbon and iron bearing particles in the flue dust are larger than about 5 microns and substantially all the zinc and lead bearing particles are less than about 5 microns and may be submicron in size. Therefore, to separate a substantial portion if not all of the relatively small zinc and lead bearing particles from the larger carbon and iron bearing particles, a size separation or cut in the hydrocyclone should be made at about 5 microns and not less than 3 microns, i.e. $d_{50}$ should be not greater than 5 microns. The term $d_{50}$ is defined as the particle size which has a 50 percent probability of reporting to the classifier underflow.

The hydrocyclones may have an inside diameter of between about 45-55 mm, a vortex finder of between about 12.7 to 16.7 mm, and an apex diameter of between about 4.5 to 8.0 mm. The pressure drop across the hydrocyclone is regulated to be between about 205 and 410 k Pa. The inside diameter of the hydrocyclone most preferred is about 50 mm. The vortex finder most preferred is 14.3 mm and the apex diameter most preferred is 4.76 mm. Of course, the inside diameter, the size of the vortex finder and the apex diameter are interrelated and are predetermined by the $d_{50}$ or "cut-point" at which separation is to be achieved in the hydrocyclone. As noted the "cut-point" or $d_{50}$ is between about 3 microns and 5 microns. At a size separation between 3 to 5 microns, approximately 20 weight percent of the particles in the slurry will report to the hydrocyclone overflow 21. These particles are a substantial portion of the zinc and lead bearing particles and a recovery of the zinc and lead bearing particles of between about 78 and 96 weight percent and 75 and 98 weight percent, respectively, is realized. The hydrocyclone overflow may be partially dried and stored for use in zinc and lead recovery processes or may be passed to waste. About 80 weight percent of the particles in the slurry report to the hydrocyclone underflow 22. These particles are a substantial portion of the carbon and iron bearing particles and a recovery of the carbon and iron bearing particles of between 70 and 94 weight percent and between 74 and 93 weight percent, respectively, is realized. Of course, negligible amounts of zinc and lead bearing particles will report to the hydrocyclone underflow and negligible amounts of carbon and iron bearing particles will report to the hydrocyclone overflow.

A "split" in the water content of the slurry is also made. The water reporting to the hydrocyclone underflow is not more than 10 weight percent of the water charged to the hydrocyclones. A relatively dense, "dry" underflow product which requires little if any dewatering is thus obtained from the hydrocylcones. Optionally, the hydrocyclone underflow may be passed to a filter to further dry the material prior to passing the particles to a preparation plant (not shown) wherein the particles are used to make sinter or pellets which are charged into the blast furnace. The water or filtrate may be recycled or passed to waste.

Turning now to the modifications wherein the water in the slurry is treated to reduce the quantity of dissolved zinc and lead in the water, as shown in FIG. 2 the thickened aqueous slurry 10 and a quantity of a neutralizing agent 24, an aqueous suspension of lime, are charged into reactor A 23. The water in the slurry must be acidic, for example have a pH between about 5.0 and 7.0 before any zinc and lead will dissolve in the water.

A sufficient amount of the lime is added to adjust the pH of the water to between 8.4 and 9.4. At a pH of 8.2 a portion of dissolved zinc and lead values are precipitated. The addition of lime is continued until a pH of 9.4 is achieved. At this pH level the amount of zinc and lead remaining in the water has been reduced to acceptable environmental standards. Since zinc and lead are soluble in highly basic aqueous solutions, it is necessary to prevent the addition of too much lime to keep the pH of the water to below about pH 9.4 to prevent the resolution of zinc and lead values in the water, thereby recontaminating the water. The treated slurry is then processed in hydrocyclones as shown in FIG. 1 and previously described. The precipitated zinc and lead values are removed with zinc and lead bearing particles in the hydrocyclone overflow.

As shown in FIG. 3, it is also possible to charge at least a portion of the thickener overflow water 13 into reactor A 23 to remove a substantial portion of dissolved zinc and lead values contained in the water. In this case, it will be necessary to add additional amounts of lime to the mixture in reactor A to precipitate the zinc and lead values in the overflow water.

The modification shown in FIG. 5 is directed to treating the hydrocyclone overflow 21 and thickener water overflow 13 with lime 24 in reactor A 23 to precipitate a substantial portion of the dissolved zinc and lead values in the water. In this case, it is prudent to pass a portion of the thickener water overflow to waste so that the amount of lime added to neutralize the water in reactor A is reduced. The mixture 25 formed in reactor A is passed to a second thickener 26 where the zinc and lead particles and the precipitated zinc and lead values are allowed to settle to the bottom 27. The water overflow from the second thickener is recycled in the system or may be passed to waste. The sludge 28 formed in the bottom of the second thickener is filtered in filter 29. The filter cake 30 formed in the filter 29 is wasted or stored for subsequent processing to recover the zinc values. The filtrate 31 is recycled to the second thickener 26.

Another modification of the method shown in FIG. 1 is shown in FIG. 4. In this modification, at start up a lime slurry 24 together with the hydrocyclone overflow 21 and filtrate 31 produced by filtering the hydrocyclone underflow 22 are charged into reactor A 23. The mixture 33 remains in the reactor A for a time to precipitate a substantial portion of the dissolved zinc and lead values. The precipitate forms on the lime particles. The mixture is passed to a second thickener 34 and allowed to remain for a time to allow the zinc and lead bearing particles and the precipitated zinc and lead values formed on the lime particles to settle to the bottom 35 of the second thickener. The water overflow 36 from the thickener is essentially clear water and will meet accepted environmental standards.

The sludge 37 formed in the bottom of the second thickener is divided into two portions. One portion 38 is wasted or stored for subsequent processing to recover the zinc values therein. The other portion 39 is recycled to reactor B 41 and is mixed with the lime slurry 24. The lime slurry-sludge mixture is then charged into reactor A 23.

As previously noted in the start-up of this modification, the lime suspension 24 is initially mixed with the water to be neutralized. After the initial sludge 39 has been formed in the second thickener 34 and a portion of the sludge separated to be recycled, the lime suspension is mixed with the sludge in reactor B 41 and that mixture 40 is charged into reactor A 23 to treat the water. Mixing a portion of the sludge with the lime suspension improves the efficiency of the precipitation of zinc values in reactor A. The reason for the increased efficiency is not understood, however it is believed that initial mixing of the sludge and lime suspension provide additional nuclei for the deposition of precipitated zinc values and hence act as a "catalyst" for the precipitation of the dissolved zinc values.

The water in the thickened aqueous slurry may contain cyanides. Cyanides contaminate the water and prevent precipitation of zinc and lead values by the neutralization process in an alkaline environment. It is necessary to remove the cyanides by conventional alkaline chlorination processes or other processes well known in the art.

In a specific example of the invention an aqueous slurry containing 4.7 weight percent particles was removed from the bottom of the thickener. The solids had a chemical composition listed below:

| Material | Weight Percent |
|---|---|
| Fe (T) | 36.4 |
| C | 27.3 |
| Zn | 1.38 |
| Pb | 0.34 |
| $SiO_2$ | — |
| S | 1.16 |
| $Al_2O_3$ | — |
| $K_2O$ | 0.46 |
| $Na_2O$ | 0.17 |

The slurry was screened on a 5 mesh screen to remove all the tramp material and all particles larger than 4 mm. The amount of such larger material was negligible.

The slurry which passed through the screen contained 100 weight percent $-100$ mesh size particles. The slurry was fed at a rate of 250 l/minute into a manifold feeding 4 hydrocyclones. Each hydrocyclone had an inside diameter of 51 mm, a vortex finder of 14.3 mm and an apex diameter of 4.76 mm. A pressure between 400 and 410 k Pa was maintained in the hydrocyclones. A size cut was made at about 5 microns. Samples taken from the hydrocyclones underflow and hydrocyclone overflow were analyzed to determine their chemical compositions shown below:

| Material | Hydrocyclone Underflow Product Weight Percent | Hydrocyclone Overflow Product Weight Percent |
|---|---|---|
| Fe (T) | 40.2 | 22.4 |
| C | 31.2 | 12.7 |
| Zn | 0.20 | 5.76 |
| Pb | 0.04 | 1.45 |
| S | 0.45 | 3.8 |
| $K_2O$ | 0.20 | 1.9 |
| $Na_2O$ | 0.06 | 0.6 |

Based on the feed to the hydrocyclones, 80 weight percent of the particles having a $d_{50}$ size about 5 microns reported to the hydrocyclone underflow and include recoveries of 93 percent carbon bearing particles and 94 percent iron bearing particles and 20 weight percent particles reported to the hydrocyclone overflow and included recoveries of 87 weight percent zinc bearing and 88 weight percent lead bearing particles.

The hydrocyclone underflow contained about 9 weight percent of the water charged to the hydrocyclones.

The water in the slurry of the above described example had a pH 7.0 and contained 48 ppm of dissolved zinc and 0.5 ppm of dissolved lead. The slurry was treated by adding about 3 pounds of $Ca(OH)_2$ per 1000 gallons of water to the slurry to adjust the pH to 9.2. The water in both the underflow and overflow hydrocyclone was tested and found to contain under 0.02 ppm dissolved zinc and under 0.1 ppm dissolved lead. Both of the values are below acceptable environmental standards.

We claim:

1. A method for treating an aqueous slurry of blast furnace flue dust containing between about 1 and 36 weight percent particles having a size consist of submicron up to 6.35 mm, about 80 weight percent of the particles are carbon and iron containing particles and about 20 weight percent of the particles are zinc and lead bearing particles and a substantial portion of the carbon and iron bearing particles are separated from the zinc and lead particles and are collected as a usable product, the method comprising:

(a) straining the aqueous slurry of blast furnace flue dust to make a size separation at about 4 mm whereby all the relatively large foreign matter and the carbon and iron bearing particles larger than 4 mm are separated as a strainer overflow from substantially all the particles which are smaller than 4 mm and which are collected as a strainer underflow containing between 3 and 20 weight percent of the particles in the aqueous slurry of blast furnace flue dust, (b) separating substantially all the carbon and iron bearing particles from the foreign matter in the strainer overflow, (c) treating the strainer underflow of step (a) in at least one hydrocyclone operating at above atmospheric pressure wherein a substantial portion of the carbon and iron bearing particles which have a size larger than about 5 microns and not more than about 10 weight percent of the water in the strainer underflow are separated as a hydrocyclone underflow from substantially all the zinc and lead bearing particles having a size smaller than about 5 microns and not less than about 90 weight percent of the water in the strainer underflow as a hydrocyclone overflow, (d) passing the hydrocyclone overflow of step (c) to storage, and (e) passing the carbon and iron bearing particles in the hydrocyclone underflow to a filter to remove a portion of the water contained therein, as a filtrate and recovering the carbon and iron bearing particles as a filter cake, (f) passing the filtrate to waste, and (g) passing the filter cake to a preparation plant.

2. The method of claim 1 in which the at least one hydrocyclone of step (c) has an inside diameter between about 45 and 55 mm, an apex diameter between about 4.5 and 8 mm and a vortex finder diameter between about 12 and 18 mm.

3. The method of claim 1 in which the at least one hydrocyclone of step (c) has an inside diameter of 51 mm, an apex diameter of 4.76 mm and a vortex finder diameter of 12.7 mm.

4. The method of claim 1 in which the strainer underflow contains between about 5 to 15 weight percent particles in the aqueous slurry.

5. The method of claim 1 in which the strainer underflow of step (b) is treated with a sufficient amount of a neutralizing agent to adjust the pH of the water to between 8.4 and 9.4 prior to being charged into the hydrocyclone.

6. The method of claim 5 in which the neutralizing agent is lime.

7. The method of claims 5 or 6 in which a sufficient amount of lime is added to the strainer underflow to adjust the pH to between about 9.0 and 9.4.

8. The method of claim 1 including the additional steps of:

(h) passing the hydrocyclone overflow of step (c) and the filtrate of step (f) and a mixture of lime suspension and sludge into a reactor, (i) stirring the mixture for a time to precipitate a substantial portion of zinc and lead values dissolved in the hydrocyclone overflow, (j) passing the mixture to a thickener wherein the zinc and lead particles settle to the bottom to form a sludge and clarified water overflows the thickener, (k) passing the water overflow to waste, and (l) recycling a portion of the sludge to the reactor and sending the remainder of the sludge to waste.

9. The method of claim 1 including the additional step of filtering the hydrocyclone underflow of step (c) to remove an additional amount of water therefrom prior to sending the underflow to a preparation plant.

* * * * *